UNITED STATES PATENT OFFICE.

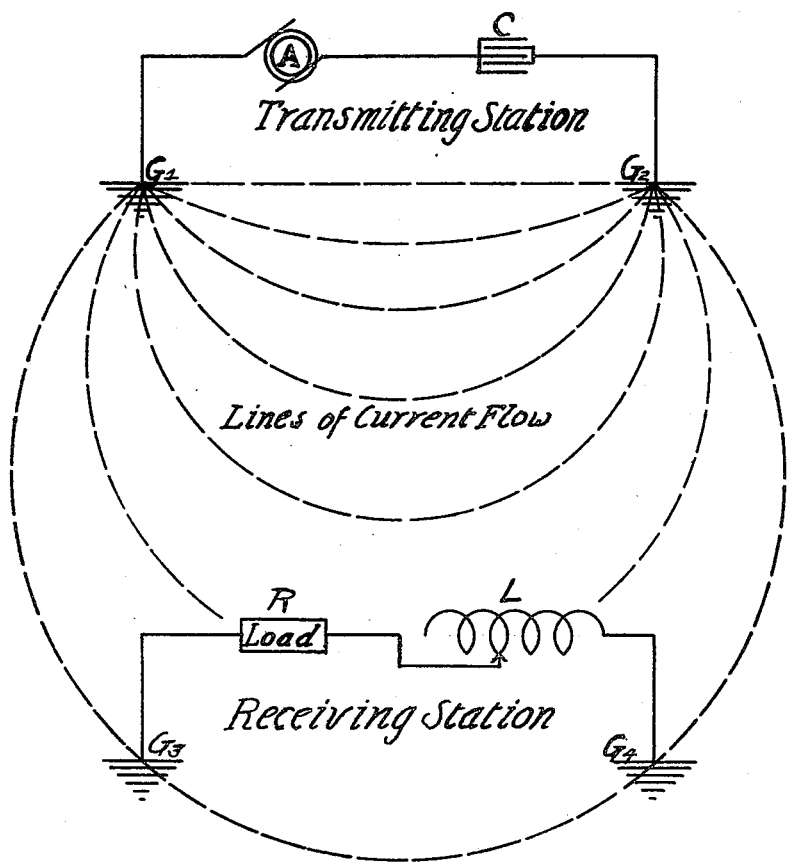

CHARLES HARVEY ROE, OF WEIDMAN, MICHIGAN.

ART OF THE TRANSMISSION OF ELECTRICAL POWER WITHOUT WIRES.

1,333,095.      Specification of Letters Patent.      Patented Mar. 9, 1920.

Application filed August 1, 1918. Serial No. 247,839.

*To all whom it may concern:*

Be it known that I, CHARLES HARVEY ROE, a citizen of the United States, residing at Weidman, in the county of Isabella and the State of Michigan, have invented new and useful Improvements in the Art of the Transmission of Electrical Power Without Wires, of which the following is a specification.

This invention has for its object the transmission of electrical energy or power in the form of alternating current from a transmitting station to a distant receiving station where the current is utilized to operate electrical devices, all without the use of intermediate wires or other special conductors.

My method employs the principle of resonance in alternating current circuits wherein currents are propagated entirely by conduction, and is to be differentiated from all methods employing electric, electro-magnetic or electro-static waves and methods whereby currents are induced at a distance by electro-magnetic or electro-static fields. In the drawing, an alternating current circuit in which the impressed electromotive force is out of phase with the current is closed by connecting it at two separated points to the earth. This is shown in the diagram by an alternator A in series with a condenser C and the terminals of the circuit grounded at two points $G_1$ and $G_2$ distant from each other. The current flowing then has a wattless component and spreads out in all directions from the ground terminals $G_1$ and $G_2$ at the transmitting station as indicated by the dotted lines. If then two grounded terminals $G_3$ and $G_4$ at a distant receiving station be connected to a suitable receiving device, they will lie in the path of some one line of current flow from the transmitting station and an electromotive force, even though very slight, will be impressed upon the receiving circuit. A reactance introduced into the receiving circuit of such nature and dimensions as to produce conditions of resonance will then cause whatever current may flow as a result of the electromotive force impressed at the ground terminals $G_3$ and $G_4$ to be in phase with the generator electromotive force, that is, of unity power factor, and it may be used to actuate electrical devices. This is represented in the diagram by a variable inductance L adjustable to counterbalance the capacity C at the transmitting station. The load R is shown in series with it, the terminals of the circuit being grounded at $G_3$ and $G_4$ in the same manner as those at the transmitting station.

In the figure there are two components of current flowing through the alternator A. One is almost ninety degrees behind the generated electromotive force and circulates through the circuit $A-C-G_2-G_1-A$, the great angle of phase difference being due to the use of the reactance in series, as at C; this component will be termed the wattless component. The other component is nearly in phase with the generated electromotive force and circulates through the circuit $A-C-G_2-G_4-L-R-G_3-G_1-A$; this component will be termed the power component, the current and electromotive force being very nearly in phase because the separate tendencies of the two reactances L and C are in opposite directions and operate to neutralize each other. At the transmitting station, the wattless component may be kept very low by using sufficiently high reactance in series as at C; that is, the short circuit current through the ground between $G_1$ and $G_2$ or vice versa may be made very small and since even that is of a low power factor, the loss of power due to this feature may be maintained at a very low figure indeed. Consider now the circuit of the power component. According to the principles of alternating currents as expounded in standard textbooks and generally accepted, a non-reactive resistance in a circuit containing capacity and inductance in such proportions that $$2(\pi)fL \text{ equals } \frac{1}{2(\pi)fC}$$

where $f$ is the frequency of the circuit in cycles, L is the inductance in henries, C is the capacity in farads, will be traversed by a current whose magnitude is determined only by the electromotive force impressed upon the non-reactive resistance and the value of the resistance itself; that is, Ohm's law in its simplest form applies. In the circuit $A-C-G_2-G_4-L-R-G_3-G_1-A$, therefore, the two reactances L and C, being in series with each other, tend to neutralize each other and we have only the ohmic resistance of the circuit and of the load R to limit the amount of the current flowing. Accordingly, by keeping the ohmic resistance of the entire circuit low enough and so arranging the various parts of the system as to impress the highest possible electromotive force across the terminals of the load R, the power component of the current flowing through R may be many times, even thousands, greater than the wattless component through the ground between $G_1$ and $G_2$. Therefore, the efficiency of transmission, as defined by $$\text{Efficiency} = \frac{\text{Watts transmitted and utilized in load R}}{\text{Watts transmitted and utilized in load R plus watts lost in short circuit between } G_1 \text{ and } G_2}$$

may be very high. This high efficiency of transmission is the principal advantage I claim for my invention. All other methods using conduction through the ground or other medium merely send out current in all directions from the transmitter and only a very small part of the current is picked up at the receiver and made to do work. That is, the efficiency of transmission is very low. By all other systems it is necessary to transmit hundreds or thousands of watts (sometimes hundreds of kilowatts) into the ground or other common medium in order to be able to pick up sufficient current at the receiver to operate the most sensitive devices known to electrical science. With my system this enormous waste of power is avoided and it is possible by my method to transmit power through the ground or other medium without wires with a loss of only a fraction of one per cent other than iron, copper and dielectric losses in the apparatus employed.

In practical application every effort is made to increase the resistance between the grounded terminals $G_1$ and $G_2$ at the transmitting station and thereby increase the electromotive force impressed upon the ground terminals $G_3$ and $G_4$ at the receiving station. This may be done by taking advantage of natural conditions, as for instance, where the two ground connections are made in two separate river beds more or less parallel to each other, the streams then acting as independent conductors. Veins of conducting ores may also be used, or even strata of earth separated by strata of material of lower conductivity, e. g., rock. One terminal might be grounded at the surface of the earth and the other carried down an insulated conductor and grounded several hundred or a thousand feet below the surface. Of course the terminals at the receiving end must be similarly connected to the same natural conductors.

I claim:

The art of transmitting electrical power through the earth as a medium from a transmitting circuit to a receiving circuit, which art comprises the production of alternating currents of power factor less than unity, the impressing of said currents on an earth path and the increasing of the power factor of a part of said currents in such receiving circuit.

CHARLES HARVEY ROE.